United States Patent
Sauermann (10) Patent No.: US 6,752,422 B2
(45) Date of Patent: Jun. 22, 2004

(54) RESTRAINING SYSTEM FOR A DRIVER OF A VEHICLE

(76) Inventor: Hans Sauermann, Im Gewerbegebiet 8, D-85119 Ernsgaden (DE)

(*) Notice: Subject to any disclaimer, the term of this patent is extended or adjusted under 35 U.S.C. 154(b) by 0 days.

(21) Appl. No.: 10/374,322

(22) Filed: Feb. 26, 2003

(65) Prior Publication Data

US 2003/0136599 A1 Jul. 24, 2003

Related U.S. Application Data

(62) Division of application No. 09/833,545, filed on Apr. 12, 2001.

(30) Foreign Application Priority Data

Apr. 14, 2000  (DE) .......................................... 100 18 878
Apr. 20, 2000  (DE) .......................................... 100 19 929
Sep. 12, 2000  (DE) ..................................... 200 15 817 U (51) Int. Cl.[7] .............................................. B60R 21/11

(52) U.S. Cl. ....................... 280/748; 280/756; 297/113; 297/115

(58) Field of Search ................................ 280/748, 756; 297/113, 115, 216.13

(56) References Cited

U.S. PATENT DOCUMENTS

| | | | | |
|---|---|---|---|---|
| 3,874,476 A | * | 4/1975 | Monaghan | 280/753 |
| 3,899,042 A | * | 8/1975 | Bonar | 297/487 |
| 4,097,088 A | * | 6/1978 | Meiller | 297/411.38 |
| 4,300,788 A | * | 11/1981 | Sperling | 280/748 |
| 4,598,921 A | * | 7/1986 | Fenwick | 280/250.1 |
| 5,129,478 A | * | 7/1992 | Suenaga et al. | 180/268 |
| 5,290,092 A | * | 3/1994 | Geer | 297/411.32 |
| 5,326,154 A | * | 7/1994 | Williamson et al. | 297/411.36 |
| 5,366,036 A | * | 11/1994 | Perry | 180/65.1 |
| 5,383,532 A | * | 1/1995 | Shonai et al. | 180/269 |
| 5,730,458 A | * | 3/1998 | Byon | 280/730.2 |
| 6,217,119 B1 | * | 4/2001 | Cook et al. | 297/411.32 |
| 6,299,207 B1 | * | 10/2001 | Bares | 280/748 |
| 6,471,297 B1 | * | 10/2002 | Runde et al. | 297/411.32 |
| 6,557,893 B2 | * | 5/2003 | Sauermann | 280/748 |

* cited by examiner

Primary Examiner—Paul N. Dickson
Assistant Examiner—Toan C To
(74) Attorney, Agent, or Firm—Collard & Roe, P.C.

(57) ABSTRACT

A restraining device for protecting the driver of a vehicle. The restraining system has at least one safety rollover bar laterally mounted next to the seat of the driver. The safety rollover bar can be swiveled from an vertical release position into a horizontal restraining position by a shaft extending transversely in relation to the longitudinal expanse of the vehicle. The shaft is driven by an electric motor via a transmission.

14 Claims, 8 Drawing Sheets

RESTRAINING SYSTEM FOR A DRIVER OF A VEHICLE

"This is a divisional of co-pending application(s) Ser. No. 09/833,545 filed on Apr. 12, 2001.

BACKGROUND OF THE INVENTION

1. Field of the Invention

The invention relates to a restraining system for a driver of a vehicle.

2. The Prior Art

Various restraining systems for drivers of fork-lift trucks are known from the FTL-Research Report of the Gerhardt-Mercator Universität Gesamthochschule Duisburg. These restraining systems hold the driver within the cabin in the event the floor conveyor vehicle tilts over. This feature is important for preventing the driver from falling under the vehicle while the vehicle is rolling over, which would lead to very serious injuries. These restraining systems protect the driver and do not inhibit movement of the driver when he is getting into or out of the vehicle or during operation. The published report proposes a rollover bar that can be swiveled in an approximately horizontal restraining position into a vertical release position on the left driver's side. However, this rollover bar does not have a locking mechanism, therefore, it can move into the release position at any time, i.e. also while the vehicle is rolling over, and therefore offers inadequate protection for the driver. Another embodiment shown in the published document contains a rollover bar that can be swivelled into the release position by a hydraulic cylinder or a lifting magnet. The rollover bar is actively connected with a contact switch attached to the seat and swivels the rollover bar into the restraining position as soon as the driver sits on the driver's seat. For swiveling the rollover bar into the release position, the driver needs to actuate a separate switch. This rollover bar system does provide adequate safety for the driver. However, it cannot be used in conjunction with small electrically operated fork-lift trucks because of the high power consumption of the lifting magnet. Since small, electrically operated fork-lift trucks have a very high center of gravity when lifting loads because of their low weight, and because they are typically equipped with an open cabin, a high demand exists for an effective restraining system for the driver.

SUMMARY OF THE INVENTION

An object of the present invention is to provide a restraining system that offers effective protection for the driver in the event the vehicle rolls over. Another object of the present invention is to provide a system that can be employed in conjunction with small vehicles as well.

These and other objects are accomplished by providing a restraining system containing at least one safety rollover bar mounted next to the seat of the driver. The safety rollover bar is capable of swiveling around a shaft between a vertical release position and a horizontal restraining position. When the safety rollover bar is in the release position, the driver can climb into and out of the vehicle without any obstruction. This is particularly important when there are confined space conditions, such as in warehouse facilities. Furthermore, the driver is not hindered by the restraining system. Therefore, the restraining system would be accepted by the drivers and would not be dismantled by the operator. When in the restraining position, the protective rollover bar is hip level and extends along at least half of the seat to provide adequate protection of the driver when the vehicle tilts over. To install the restraining system in small electric fork-lift trucks, the shaft is actively connected with the electric motor via a transmission. As compared to a lifting magnet, the electric motor of this system has particularly low power consumption and uses a small amount of energy from the on-board network of the vehicle. If need be, an AC-DC converter or a voltage bypass for adaptation to the on-board network can be provided. The range of the vehicle, which is limited by the electric charge stored in the batteries, would not be significantly reduced. This advantage is very important for the restraining system to be accepted. The motor is actively connected to the shaft via the transmission so that the electric motor can transmit the required torque to the shaft. The transmission reduces the rotational motion of the driving shaft of the electric motor so that the electric motor can be economically operated within the range of the desired number of revolutions. The swiveling motions of the shaft and the safety rollover bar occur at a low speed to avoid excessive forces of acceleration.

In another preferred embodiment, the shaft is maintained in the retaining position by the force of the electric motor so that an additional locking device is not needed. However, this would cause the electric motor to continually draw electrical current from the on-board network of the vehicle, which would reduce the range of the vehicle accordingly. Alternatively, the transmission between the shaft and the electric motor can be a self-inhibiting transmission, for example a worm gearing. However, a self-inhibiting transmission has a relatively poor efficiency rate that would lead to increased energy consumption as well. To avoid this drawback, it is preferred that the shaft is locked in the restraining position. This is accomplished by providing a cam disk to support the shaft. The cam disk is driven by the electric motor. A locking pin engages a breakthrough in the cam disk in the form of a divided circle, whereby the locking pin is axially displaced by the cam disk. The shaft is driven by the electric motor via a dead gear, which permits the cam disk to retract the locking pin before the shaft is swiveled. This movement is advantageous for locking the shaft in the restraining position.

In another preferred embodiment, a simple and effective locking device is provided by the cam disk forming at least one support surface for the locking pin. When the pin is moved by the electric motor it scans the support surface. The support surface has an inclined gradient allowing the locking pin to be axially displaced between a locking position and a release position as it moves along the cam disk. This axial movement of the locking pin is advantageous for locking the shaft.

In the locked position, the locking pin cooperates with a locking cam. The locking cam is stationarily supported so that any turning of the shaft while in the locking position is avoided. The effectiveness of the restraining system is dependent upon the working order of the on-board electrical network of the vehicle or on the electric motor.

The cam disk can also be provided with support surfaces for the locking pin. The surfaces are directed against each other, so that the pin can be forcibly adjusted in the axial direction. However, it is preferred that the locking pin be spring-loaded against the cam disk. In this case, one support surface suffices and the support surface is scanned by the locking pin.

A switch or key device can be provided for actuating the electric motor. Therefore, the shaft can be driven into the release position at any time. In the event the on-board electrical network or of the electric motor fails, shifting the shaft into the release position would no longer be possible. To make it possible for the driver to exit the vehicle, the locking pin is connected to a hand lever. The manual lever shifts the locking pin into the release position without actuating the electric motor. Since a separate hand lever has to be actuated for releasing the shaft, the safety of the retaining system while driving the vehicle is not impaired.

To obtain the simplest structure for the retaining system, the shaft contains an oblong hole into which a pin for transmitting the torque from the electric motor to the shaft is placed.

To control the retaining system and at the same time maintain high safety for the driver, it is advantageous if the safety rollover bar is used as the locking device. For this purpose, the safety rollover bar is swiveled into the retaining position about a vertical axis between a locking position and a releasing position. Therefore, an additional device is not required to release the shaft. The shaft has at least one support surface that operates with the safety rollover bar when in its locked position. The support surface prevents the safety rollover bar from swiveling outwards. In addition, the shaft can be turned into the release position by the electric motor or automatically with a spring, or by the effect of gravity of the safety rollover bar.

To enhance the safety benefits of the rollover bar, it is preferred that at least two support surfaces are provided on the shaft. One of the support surfaces is located on the face side and the other on the side facing the shaft, thereby achieving the safest possible locking effect.

To safely retain the rollover bar in the locking position when it is not actuated, it is spring-loaded in the direction of the restraining position.

In the release position, the safety rollover bar is swiveled toward the driver to prevent the shaft from being unlocked while the vehicle is rolling over. In this case, the driver presses against the safety rollover bar providing an additional load in the direction of the locking position.

To ensure that the safety rollover bar is maintained in the restraining position, the shaft is engaged by at least one spring to force the shaft in the direction of swivel. If necessary, the spring can be supported by the electric motor.

For achieving the best possible acceptance of the safety rollover bar by the driver, the shaft is supported on the driver's seat. Therefore, the shaft and the safety rollover bar are simultaneously adjusted with the driver's seat so that the relative position between the two is always preserved. Furthermore, when the driver's seat is adjusted in a low position, the driver is prevented from slipping out from under the safety rollover bar. As an alternative, the shaft can be supported on the frame of the vehicle, which simplifies the installation of the entire restraining system.

In addition, the position of the shaft can be adjustable. Therefore, each driver can adjust the safety rollover bar to his individual needs. This is accomplished by providing telescope-like elements for extending the height of the shaft so that the lateral spacing of the bar from the seat can be adjusted in accordance with the needs of the driver as well.

Furthermore, to prevent the shaft from turning beyond the release or restraining position, the shaft contains a final stop device. These stop devices are preferably formed by pins that cooperate with the locking cam.

To achieve safe locking of the shaft in the restraining position, at least one pin engages a bore in a metal holding sheet. The metal holding sheet is supported in a stationary manner and bent in the form of a "Z" to lessen the impact of the safety rollover bar when shifted into the retaining position.

To make sure that the safety rollover bar is always in the retaining position while the vehicle is being operated, the shaft is may contain a sensor. When the vehicle is ready for operation, the sensor automatically turns the shaft into the restraining position. The sensor device could be a contact on the driver's seat that registers the driver on the seat. As an alternative, the sensor could monitor the position of the selector switch for selecting the driving direction, the manual brake, the pedal whip or the steering joy stick. The sensor could also monitor the speed of the vehicle or the position of the lifting gear of the vehicle. The sensor assures that while the vehicle is operating, the safety rollover bar is in the restraining position to protect the driver.

Finally, the shaft is provided with a locking pin for use when the motor hood is open. This would prevent swiveling of the safety rollover bar when service or maintenance work is performed on the vehicle and also substantially simplifies the maintenance work.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
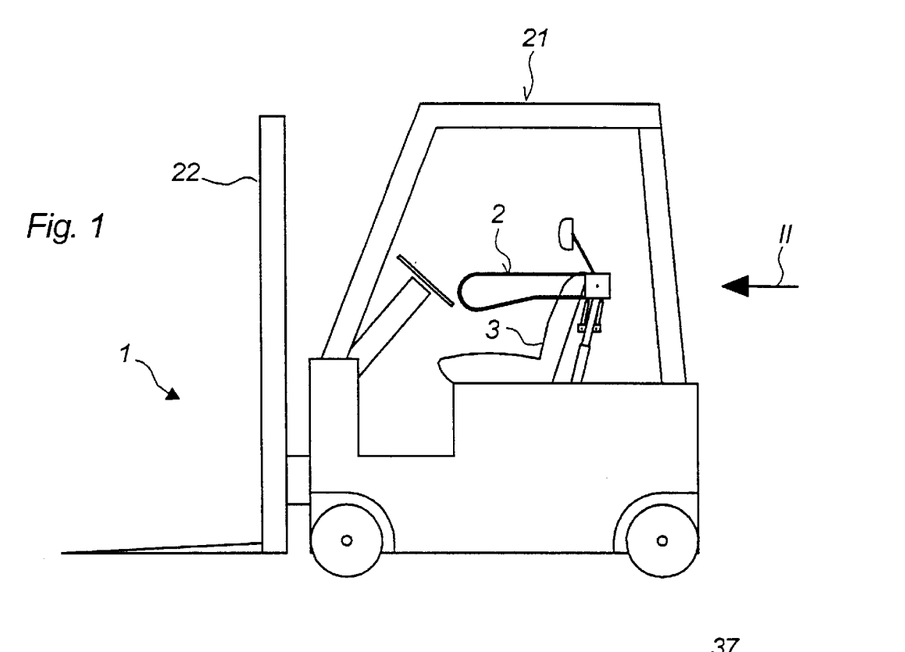
FIG. 1 is a side view of a floor conveyor vehicle.

Referring now in detail to the drawings and, in particular, FIG. 1 shows a floor transporter vehicle 1 being a fork-lift truck, equipped with a restraining device 2 for a driver (not shown). The vehicle 1 has a roof construction 21 forming an open cabin. A driver's seat 3 is arranged within the cabin. Furthermore, the vehicle 1 has lifting gear 22.

Figure 2:
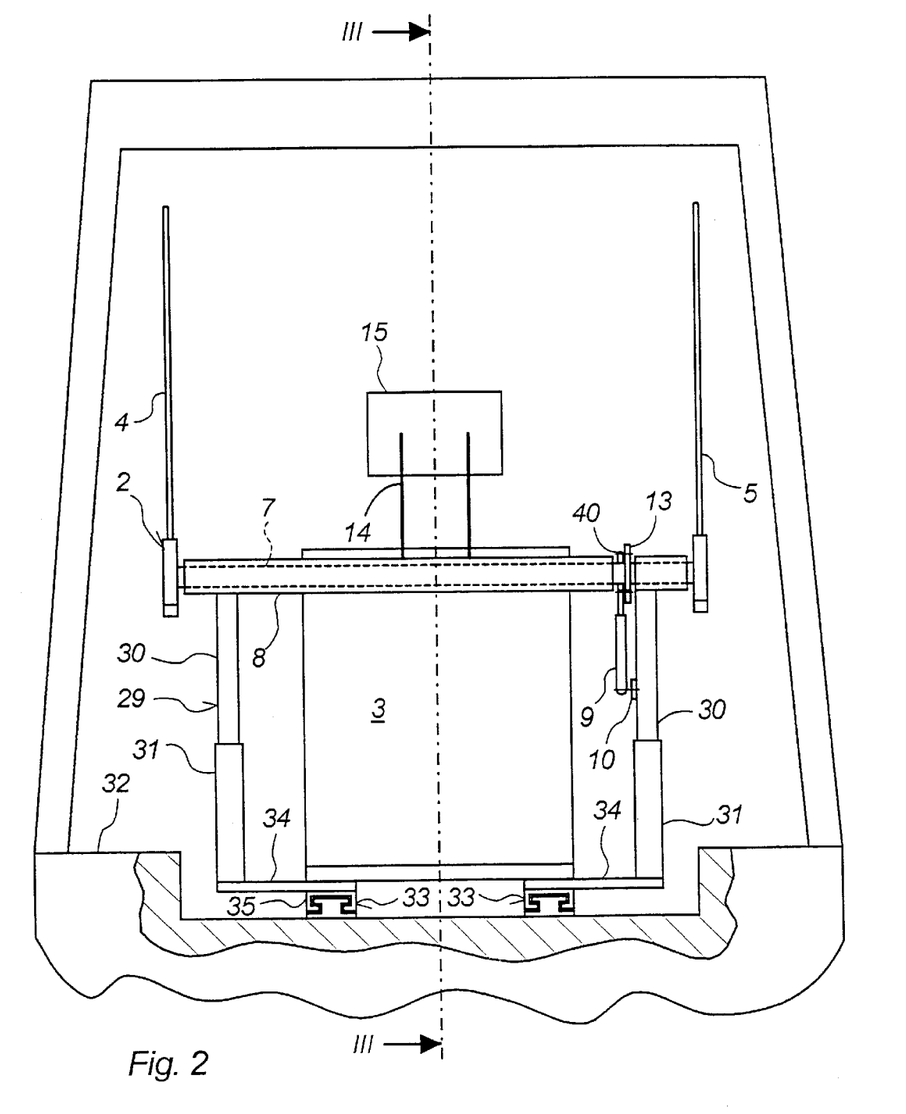
FIG. 2 is a rear view of a portion of the vehicle according to FIG. 1.

FIG. 2 shows a rear view of a portion of the vehicle 1 according to FIG. 1. The restraining device 2 comprises two safety rollover bars 4, 5, which are arranged next to the driver's seat 3 on the left and right sides, respectively. Safety rollover bars 4, 5 are connected to shaft 7 that rotates about its longitudinal axis. Shaft 7 swivels the safety rollover bars 4, 5 from their release position shown in FIG. 2, into the restraining position shown in FIG. 1.

Shaft 7 is rotatably supported by a transverse support 8 extending behind driver's seat 3 transversely in relation to vehicle 1. Transverse support 8 forms the bearing for shaft 7. Safety rollover bars 4 and 5 are preferably made of bent tubes. However, these bars may be made of solid material as well.

Shaft 7 is tensioned by a gas spring 9 in the direction of the restraining position so that safety rollover bars 4, 5 are maintained in the restraining position. In addition, safety rollover bars 4, 5 are designed in such a way that the center of gravity is located slightly in front of shaft 7 so that the bars are pressed into the restraining position by the force of gravity as well.

Transverse support 8 is connected to driver's seat 3 via vertically extending, telescope-like struts 29 and foot elements 34. Driver's seat 3 can be displaced via intermeshing guide rails 33, 35 in the longitudinal direction of the vehicle to permit seat 3 to be adapted to the individual driver. By fixing transverse support 8 on the lower end of driver's seat 3, restraining device 2 can be simultaneously adjusted with seat 3.

Struts 29 are designed telescope-like and contain tubes 30, 31 disposed inside one another to permit vertical adjustment of transverse support 8. The position of safety rollover bars 4, 5 in the restraining position can be adapted to the needs of the individual driver. Telescope-like struts 29 can be displaced longitudinally via guide rails 33, 35 and are supported on undercarriage 32 of the vehicle.

Figure 3:
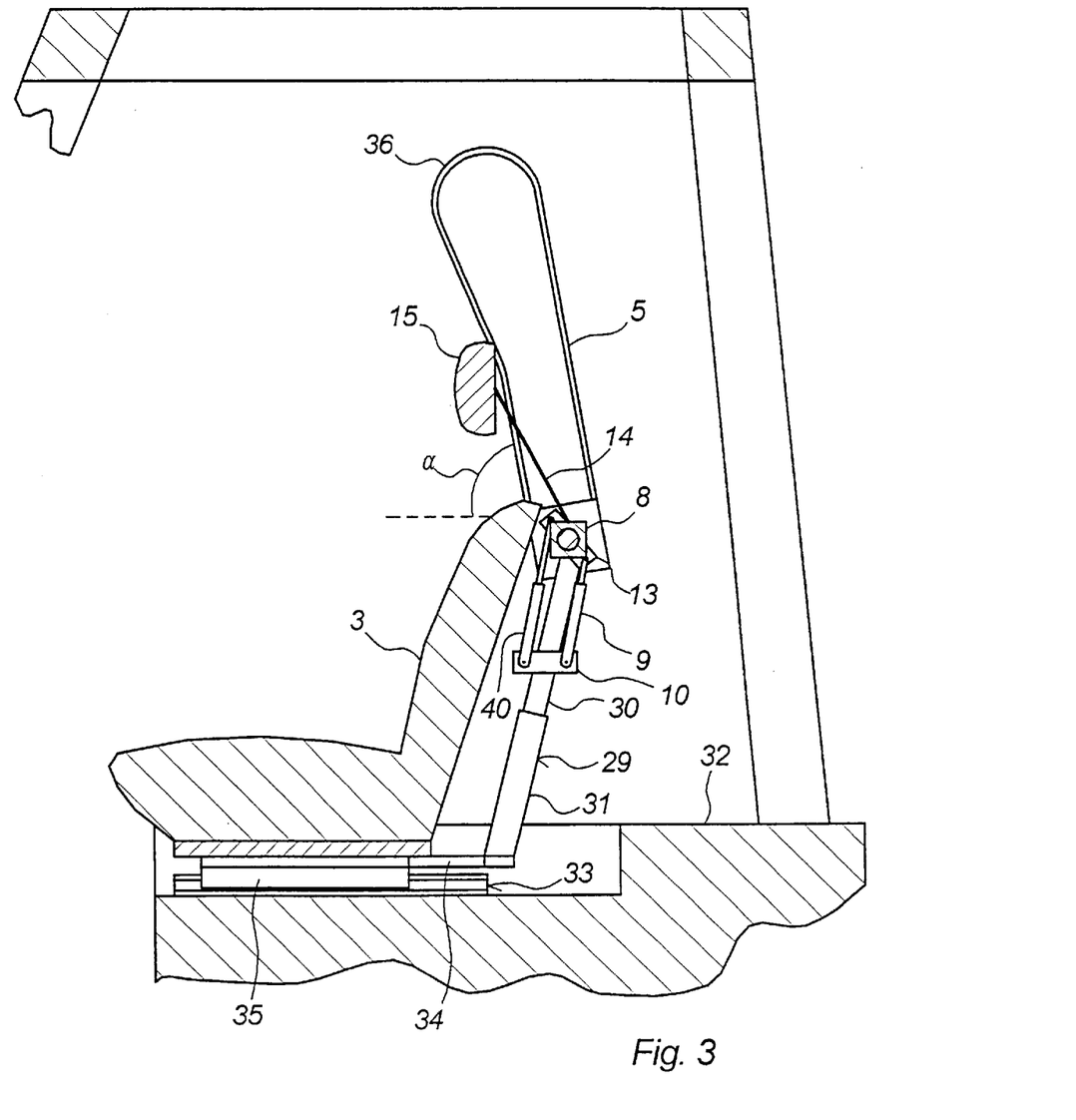
FIG. 3 is a sectional view of FIG. 2 along section line III—III, with the safety rollover bars in the release position.

FIG. 3 shows a sectional view of the vehicle 1 along the section line III—III. Safety rollover bars 4, 5 are swiveled at an angle of less than 90°, preferably about 80°. Therefore, the center of gravity of safety rollover bars 4, 5 is shifted even farther to the front to support the action of gas spring 9. Gas spring 9 is supported on a holding plate 10, which is connected to telescope-like strut 29. A second gas spring 40 is supported on holding plate 10 and counteracts gas spring 9. Gas spring 40 is weaker than gas spring 9 and slows down the swivel of safety rollover bars 4, 5 before they reach the restraining position to prevent the safety rollover bars 4, 5 from slamming into the restraining position.

Safety rollover bars 4, 5 have a belly-like bulge to prevent the thigh of the driver from slipping between driver's seat 3 and safety rollover bar 4, 5.

To reduce the speed of the swiveling motion of safety rollover bars 4, 5, a braking device can be provided in addition to gas springs 9 and 40. The braking device acts on shaft 7. A head rest 15 is secured on transverse support 8 via adjustable bars 14. To provide different widths between bars 4, 5 transverse support 8 can be mounted on engageable sections so that its length can be adapted as required.

Figure 4:
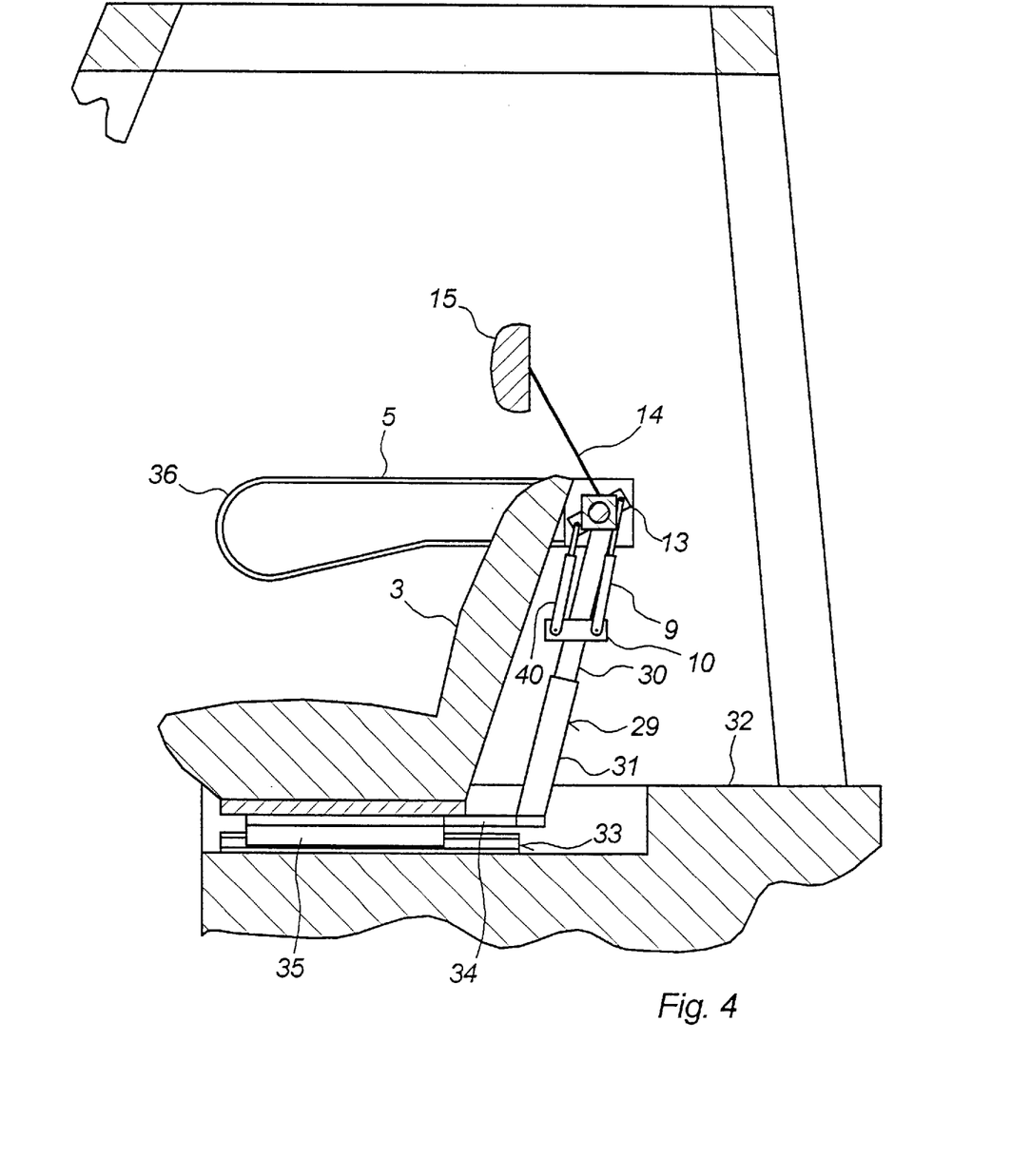
FIG. 4 shows a sectional view according to FIG. 3 with the safety rollover bars in the restraining position.

FIG. 4 shows the vehicle according to FIG. 3 with safety rollover bars 4, 5 in the restraining position. In this position, safety rollover bars 4, 5 are pointing forwards and are horizontal to protect the driver.

Figure 5:
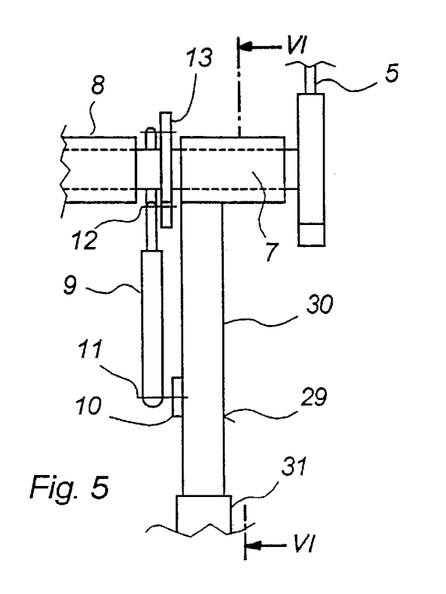
FIG. 5 shows a detailed view of FIG. 2.
Figure 6:
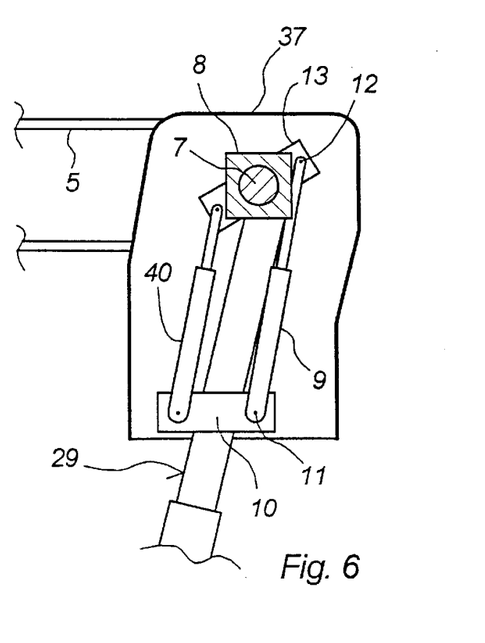
FIG. 6 is a sectional view of FIG. 5 along section line VI—VI.

FIGS. 5 and 6 show a detailed view of restraining device 2. A holding plate 13 is mounted on shaft 7. Holding plate 13 is engaged by two gas springs 9 and 40 via indicated joints 12. At the other end, gas springs 9 and 40 are connected with a second holding plate 10 via additional joints 11.

Transverse support 8 has a corresponding recess to holding plate 13 to create space for the movement of gas springs 9 and 40.

Gas springs 9 and 40 and holding plates 10 and 13 are accommodated within a protective housing 37 shown in FIG. 6. Protective housing 37 protects gas springs 9 and 40 and holding plates 10 and 13 against damage and soiling. Protective housing 37 is shaped such that is forms an arm rest for the driver on which he can support himself when driving backwards. The driver can assume a comfortable sitting position in this way in spite of having the upper part of his body turned.

Figure 7:
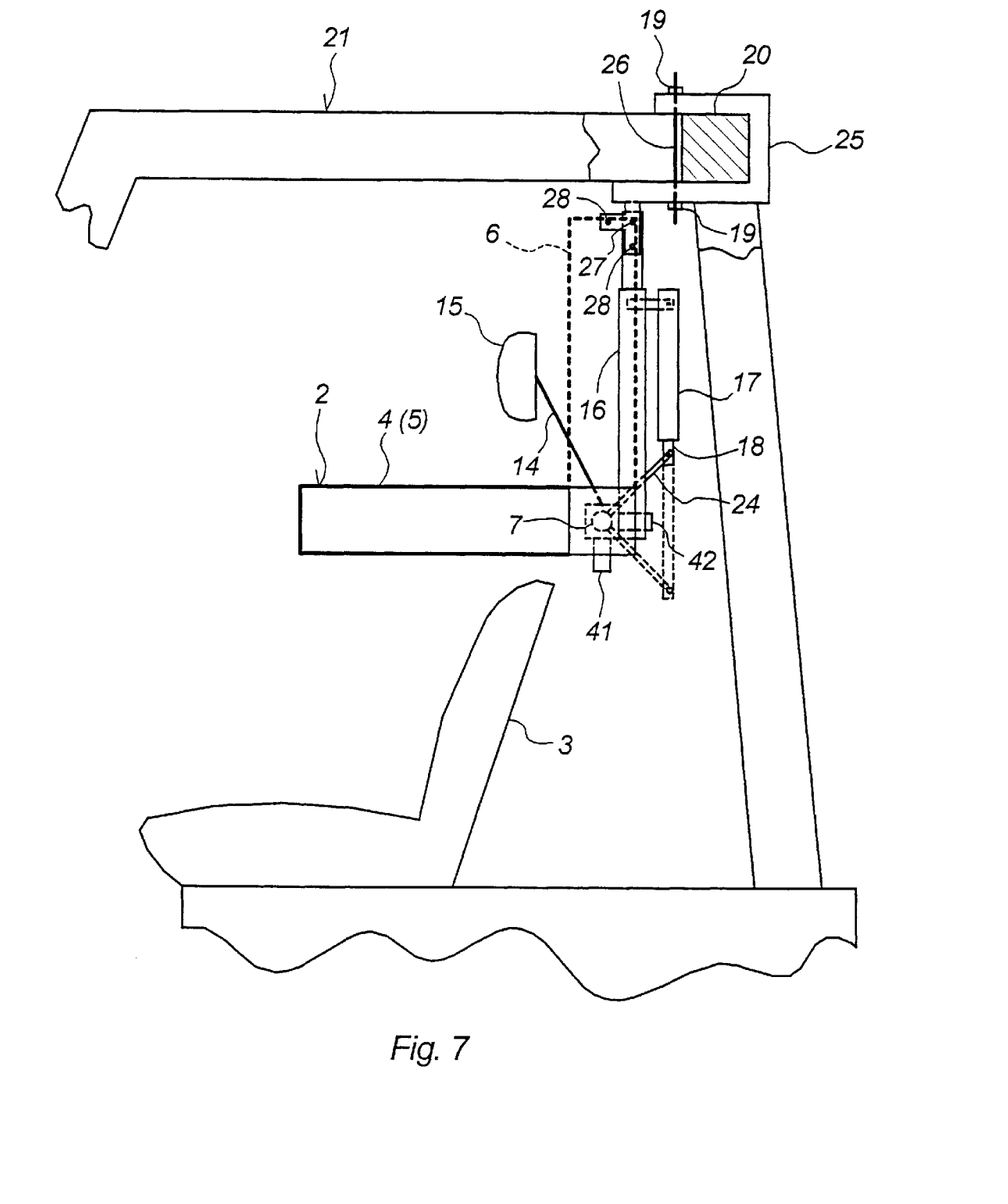
FIG. 7 is a side view of another embodiment of the invention.
Figure 8:
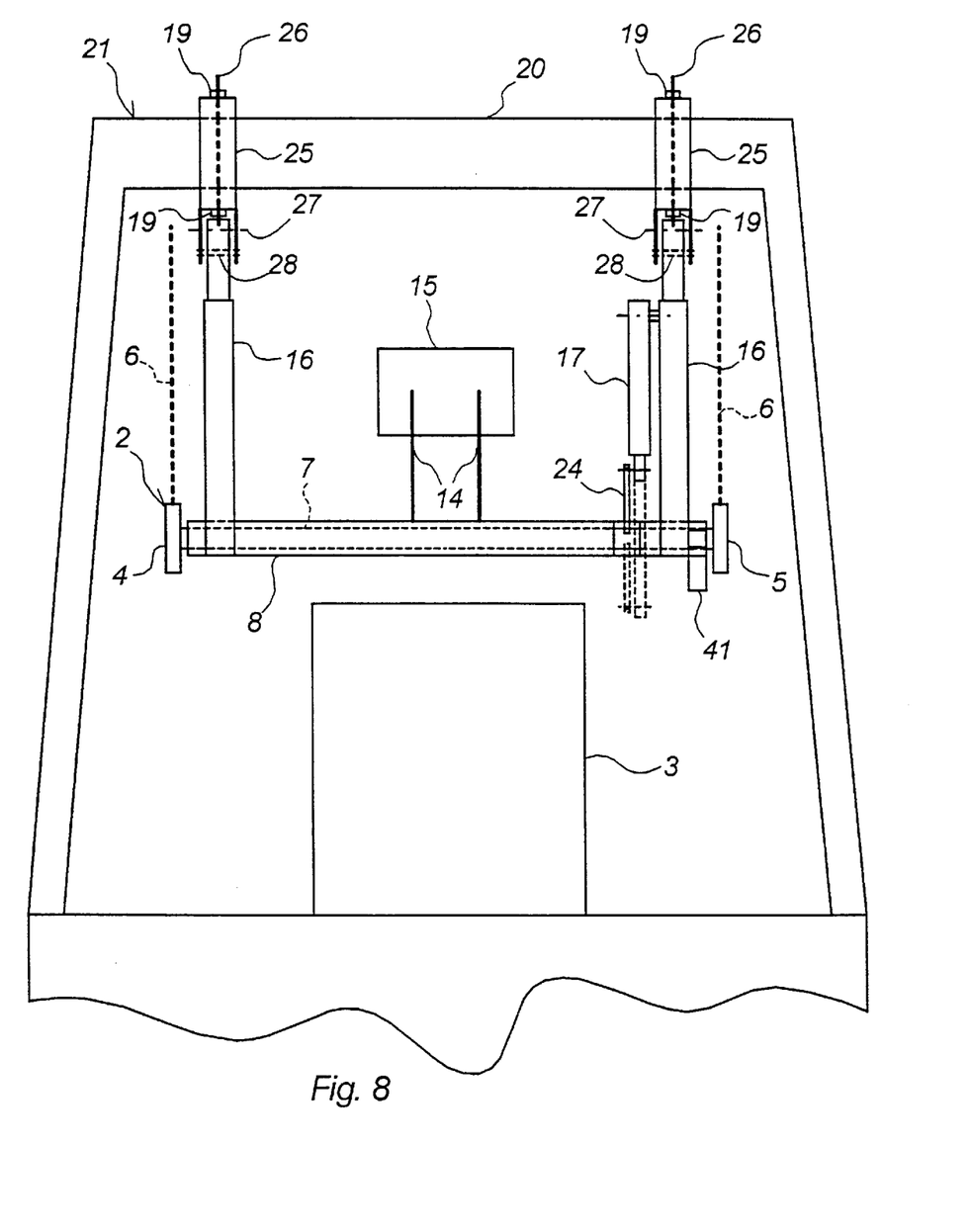
FIG. 8 is a front view of the embodiment according to FIG. 7, with the safety rollover bars in the restraining position.

FIGS. 7 and 8 show another embodiment of the restraining system according to FIG. 2. Safety rollover bars 4 and 5 have a rectangular shape, and are connected to shaft 7 that is supported by transverse support 8. The release position of safety rollover bars 4, 5 is shown in FIG. 7 by dashed-lines.

The transverse support is connected with U-shaped holding sections 25 via telescope-like bars 16, whose length can be adjusted. Holding sections 25 are secured on a cross strut 20 of roof construction 21 with bolts 26 and nuts 19. By securing restraining device 2 on roof construction 21, later attachment to existing vehicles is not a problem.

An oil damper 17 is supported on telescope-like bars 16. A piston rod 18 of damper 17 acts on a rod 24 that is connected to shaft 7. Oil damper 17 provides the required tension to drive safety rollover bars 4, 5 into the restraining position. Alternatively, it is possible to use a gas or coil spring instead of oil damper 17. Shaft 7 can also contain locking devices 41 and 42 for maintaining the shaft in the release position or in the restraining position. Locking device 41 for the restraining position is formed by a pressure ball on shaft 7. The pressure ball assures that safety rollover bars 4, 5 cannot inadvertently be swiveled into the release position while the vehicle is moving. Furthermore, a release mechanism is provided for locking device 41 in the restraining position. The release mechanism is separately actuated by the driver.

Locking device 42 for the release position has an automatically acting release mechanism that releases locking device 42 when the driver sits in driver's seat 3. For this purpose, a sensor (not shown) is provided in seat 3. The sensor contains an electrical contact switch that is triggered when loaded. Locking device 42 can be a safety bolt which, when the sensor is closed, is pulled out electromagnetically and releases the shaft from the locking device. Unlocking of safety rollover bars 4, 5 is therefore not possible as long as the driver sits on driver's seat 3. This assures that when the driver's seat is occupied, safety rollover bars 4, 5 remain in the restraining position. As an alternative, other sensors could be employed for detecting the operating condition of the vehicle.

Telescope-like bars 16 can be swiveled on roof construction 21 about an axis 27 extending transversely in relation to the longitudinal direction of the vehicle. The entire restraining device 2 can be swiveled at an angle of 90° towards the front or the rear.

Figure 9:
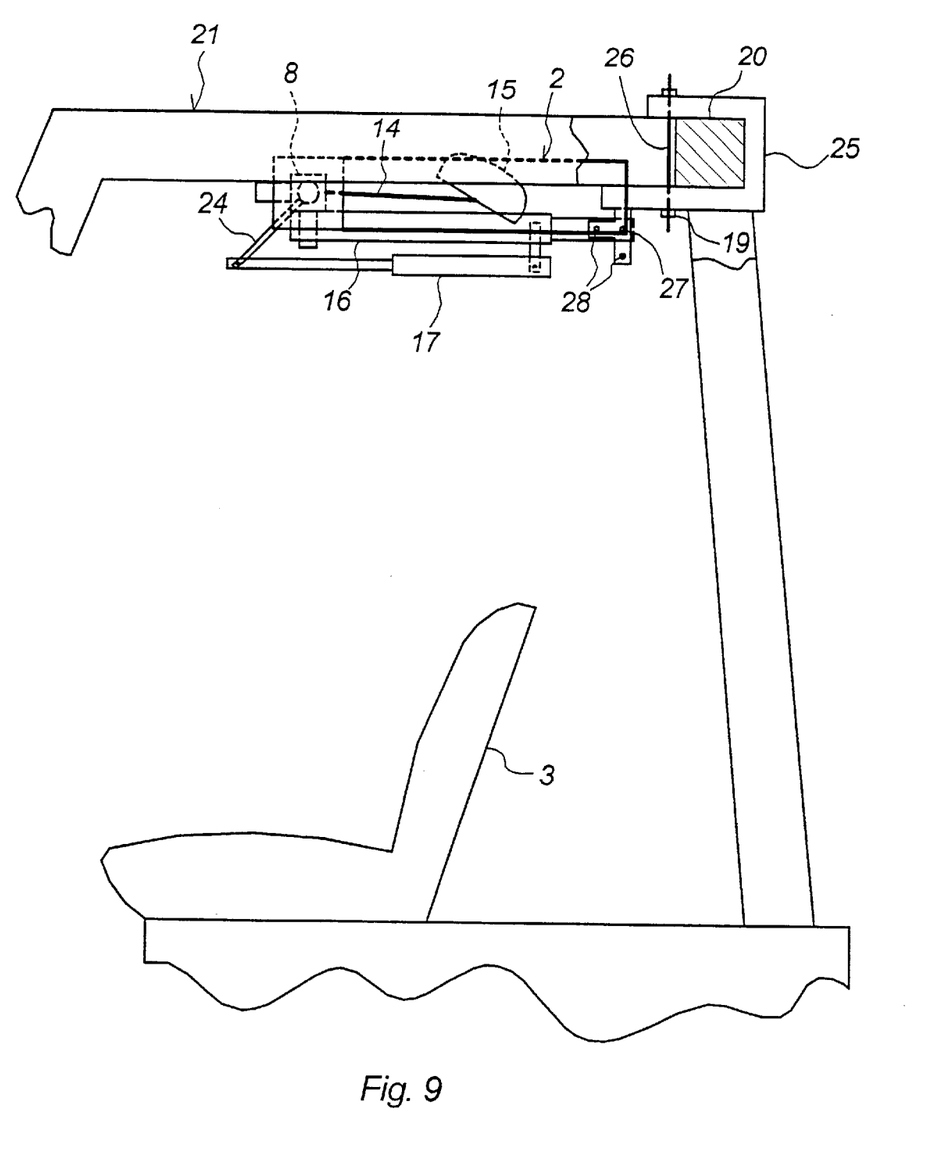
FIG. 9 shows FIG. 8 with the safety rollover bars in the release position.

FIG. 9 shows restraining device 2 in the swiveled position. When restraining device 2 is swiveled, adequate space remains available in the cabin for opening a motor hood and for working within the area of the motor. Head support 15 can be swiveled as well, so that it will not obstruct access to the motor compartment.

Figure 10:
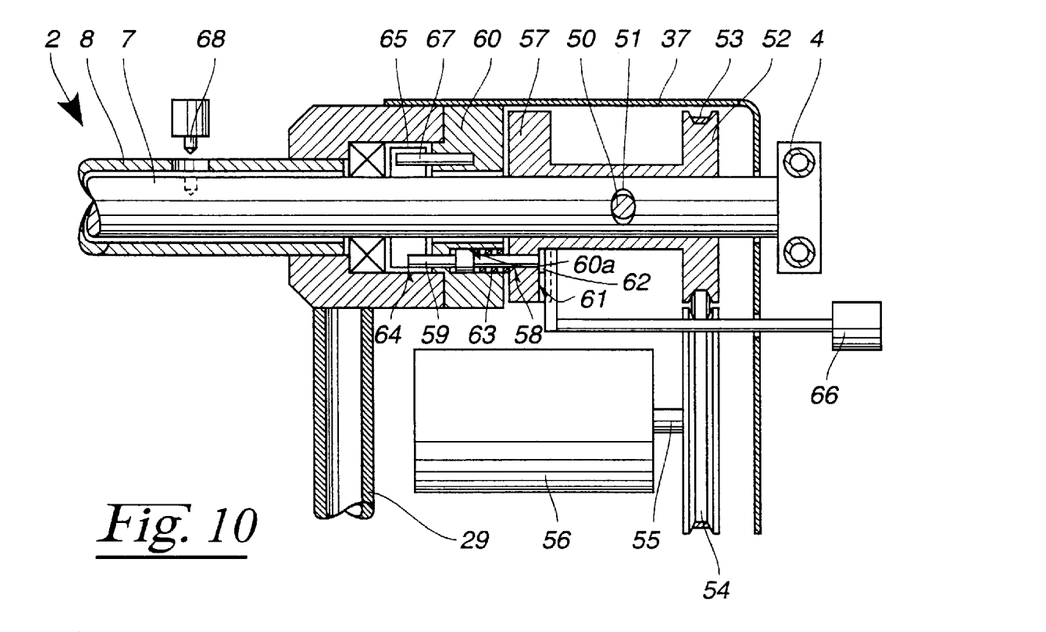
FIG. 10 is a sectional view with a cut through the shaft of the safety rollover bars.

FIG. 10 shows a sectional view of another embodiment of restraining device 2. Safety rollover bar 4 is connected to shaft 7. A belt pulley 52 is supported on shaft via a pin 50, and has limited rotation. Pin 50 is disposed in an oblong hole 51 in shaft 7. Belt pulley 52 is connected with a second belt pulley 54 via a belt 53. The second belt pulley 54 is rotationally driven by an electric motor 56 by a driving shaft 55. Electric motor 56 is equipped with a reduction gearing (not shown) for achieving a low number of revolutions by belt pulley 54. Since pin 50 engages oblong hole 51, shaft 7 can rotate to a limited extent versus belt pulley 52. As soon as pin 50 impacts the end of oblong hole 51, a form-locked connection is established between belt pulley 52 and shaft 7, so that safety rollover bar 4 is swiveled by electric motor 56.

To maintain safety rollover bar 4 in the restraining position, an axially displaceable locking pin 59 is inserted into a cam disk 57. Cam disk 57 is connected to belt pulley 52. Cam disk 57 is provided with a breakthrough 58 extending in a curved manner and concentrically in relation to shaft 7 by an angle of 90°. Locking pin 59 is positioned in a bore 60*a* of a stationarily supported disk 60 and is guided in an axially displaceable manner.

Cam disk 57 has a support surface 61, shaped in the form of a helical surface corresponding with the pitch of a thread. Support surface 61 is scanned by a disk 62 of locking pin 59. During the relative movement of cam disk 57, locking pin 59 is axially displaced by about 2 to 10 mm, preferably 5 mm. Therefore, disk 62 of locking pin 59 will always abut support surface 61 of cam disk 57. Locking pin 59 is tensioned against support surface 61 by a spring 63. A free end 64 of locking pin 59 cooperates with a cam 65 that is connected to shaft 7 when locking pin 59 is axially shifted to the left. Cam 65 assures that shaft 7 is held in its position so that any swiveling of safety rollover bar 4 is avoided.

To move shaft 7 again, shaft 7 is driven by electric motor 56 in the opposite direction, so that locking pin 59 moves back along the pitch of cam disk 57. Locking pin 59 is axially shifted to the right so that it is no longer cooperating with cam 65. By turning belt pulley 52 further, pin 50 rests against the end of oblong hole 51, so that a form-locked connection is established between shaft 7 and belt pulley 52. By turning belt pulley 52 further, safety rollover bar 4 is then swiveled into the release position.

To permit safety rollover bar 4 to be driven into the release position in the event of failure of the electrical on-board network, locking pin 59 is connected to a manual lever 66. By pulling manual lever 66, locking pin 59 is marked such that it disengages from cam 65, which cancels the lock.

In disk 60, two final stop means 67 in the form of bolts are provided. The bolts cooperate with cam 65. Stop means 67 prevent shaft 7 from swiveling beyond the release and restraining positions. In addition, two end switches (not shown) are associated with shaft 7. These switches shut off the electric motor when the release or the restraining position has been reached.

Furthermore, shaft 7 contains another locking pin 68, which is connected to a motor hood (not shown). As soon as the motor hood is opened, locking pin 68 is inserted into an opening of shaft 7 so that swiveling of safety rollover bar 4 is prevented when the motor hood is open.

Figure 11:
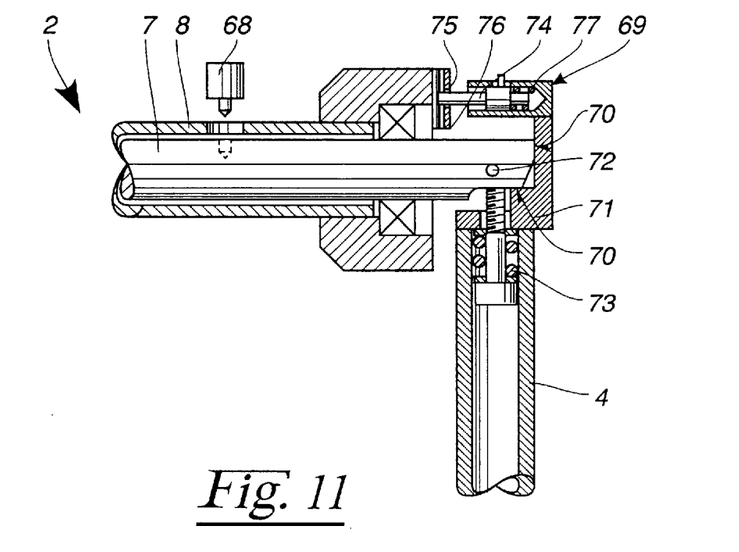
FIG. 11 is a sectional view of a locking device for the safety rollover bar.

FIG. 11 shows a further embodiment of the restraining device 2. Safety rollover bar 4 is locked in its restraining position via a locking device 69. For releasing safety rollover bar 4, it is swiveled in the direction of the driver around a pivot joint 72. For limiting the outward angle of swivel of safety rollover bar 4, shaft 7 has two support surfaces 80, which are located on the face side and on the radial side. Safety rollover bar 4 is connected with an L-shaped end piece 71 for limiting the movement of rollover bar 4.

Safety rollover bar 4 is pivotably connected with shaft 7 via a pivot joint 72, whereby the axis of rotation is aligned vertically in the restraining position. Furthermore, safety rollover bar 4 is tensioned by a spring 73 in the direction of the locking position in which end piece 71 impacts shaft 7. Any turning of shaft 7 in this position is prevented. Therefore, safety rollover bar 4 is kept in the restraining position.

To release safety rollover bar 4, it first has to be swiveled clockwise, i.e. against the driver's seat 3. A pin 74 of locking device 69 is mounted on end piece 71 of safety rollover bar 4 and is disengaged from a bore 75 of a holding plate 76. This allows safety rollover bar 4 to be swiveled into the release position.

To move safety rollover bar 4 back into the restraining position, it suffices to simply let go of it. Safety rollover bar 4 is returned to the restraining position by its own weight, as well as by the action of gas springs 9 and 40. To lessen the impact of safety rollover bar 4, metal holding plate 76 is bent in the shape of a "Z", whereby plate 76 is cantilevered at the top against pin 74. Pin 74 is therefore forced back against the action of a spring 77 until it is aligned with bore 75 of metal holding plate 76 and is inserted therein to lock shaft 7.

Accordingly, while only a few embodiments of the present invention have been shown and described, it is obvious that many changes and modifications may be made thereunto without departing from the spirit and scope of the invention.

What is claimed is:

1. A restraining system for a driver of a vehicle having a driver's seat and a frame, the restraining system comprising:

at least one safety rollover bar mounted next to the seat;

a shaft attached to the at least one safety rollover bar and being disposed horizontally along the transversae expanse of the vehicle, wherein the shaft swivels the at least one safety rollover bar from a vertical release position to a horizontal restraining position and wherein the at least one safety rollover bar swivels between a locking position and an unlocking position around a vertical axis; and at least one stop surface disposed on the shaft for limiting the swivel movement of the at least one safety rollover bar in the restraining position.

2. The restraining system according to claim 1, wherein the shaft height is adjustable.

3. The restraining system according to claim 1, further comprising at least one sensor connected to the shaft for swiveling the shaft into the restraining position when the vehicle is ready to be operated.

4. The restraining system according to claim 1, wherein the shaft comprises at least two support surfaces for the safety rollover bar.

5. The restraining system according to claim 1, wherein the safety rollover bar comprises at least one spring for applying tension in the direction of the locking position.

6. The restraining system according to claim 1, wherein when in the unlocking position, the safety rollover bar is swiveled against the seat.

7. The restraining system according to claim 1, wherein the shaft comprises at least one spring for applying tension to the shaft in the direction of swivel.

8. The restraining system according to claim 1, wherein the shaft is supported on the seat.

9. The restraining system according to claim 1, wherein the shaft is supported on the frame of the vehicle.

10. The restraining system according to claim 1, wherein the position of the shaft is adjustable.

11. The restraining system according to claim 1, wherein the shaft can be extended in a telescoping manner.

12. The restraining system according to claim 1, further comprising a cam and end stop means, both being connected to the shaft for preventing the shaft from swiveling beyond the release position and the restraining position.

13. The restraining system according to claim 1, further comprising:

at least one pin mounted on the safety rollover bar; and a stationarily supported Z-shaped holding plate containing a bore, wherein said at least one pin engages the bore for locking the shaft in the restraining position.

14. The restraining system according to claim 1, further comprising a locking pin connected to the shaft for securing the shaft when the motor hood is open.

* * * * *

UNITED STATES PATENT AND TRADEMARK OFFICE
CERTIFICATE OF CORRECTION

PATENT NO. : 6,752,422 B2
DATED : June 22, 2004
INVENTOR(S) : Sauermann

It is certified that error appears in the above-identified patent and that said Letters Patent is hereby corrected as shown below:

<u>Title page,</u>
Item [30], Foreign Application Priority Data, please add
-- Dec. 1, 2000  (DE)……………..200 20 521.8 --.

Signed and Sealed this

Fourth Day of January, 2005

JON W. DUDAS
*Director of the United States Patent and Trademark Office*